United States Patent
Athens et al.

(10) Patent No.: US 7,305,710 B2
(45) Date of Patent: Dec. 4, 2007

(54) METHOD FOR SECURELY LOADING AND EXECUTING SOFTWARE IN A SECURE DEVICE THAT CANNOT RETAIN SOFTWARE AFTER A LOSS OF POWER

(75) Inventors: G. Thomas Athens, Derby, CT (US); Robert G. Arsenault, Stratford, CT (US); Walter J. Baker, Stratford, CT (US); John A. Hurd, Lake Mary, FL (US); Wesley A. Kirschner, Hamden, CT (US); Roger J. Ratzenberger, Jr., Milford, CT (US); Albert P. Jacques, Fairfeld, CT (US); Thomas O. Matthews, Wallingford, CT (US)

(73) Assignee: Pitney Bowes Inc., Stamford, CT (US)

( * ) Notice: Subject to any disclaimer, the term of this patent is extended or adjusted under 35 U.S.C. 154(b) by 933 days.

(21) Appl. No.: 10/425,321

(22) Filed: Apr. 29, 2003

(65) Prior Publication Data

US 2004/0221175 A1    Nov. 4, 2004

(51) Int. Cl.
  *G06F 7/04*   (2006.01)
  *H04L 9/00*   (2006.01)
(52) U.S. Cl. ............... 726/26; 713/176; 705/60; 726/9
(58) Field of Classification Search ......... 713/176; 705/60
  See application file for complete search history.

(56) References Cited

U.S. PATENT DOCUMENTS

| | | | | |
|---|---|---|---|---|
| 5,682,427 A | * | 10/1997 | Seestrom | 380/51 |
| 6,041,704 A | * | 3/2000 | Pauschinger | 101/91 |
| 6,064,995 A | * | 5/2000 | Sansone et al. | 705/410 |
| 6,438,530 B1 | * | 8/2002 | Heiden et al. | 705/401 |
| 6,620,047 B1 | * | 9/2003 | Alcorn et al. | 463/37 |
| 2001/0013025 A1 | * | 8/2001 | Ananda | 705/60 |
| 2002/0042884 A1 | * | 4/2002 | Wu et al. | 713/201 |
| 2004/0158742 A1 | * | 8/2004 | Srinivasan et al. | 713/201 |

\* cited by examiner

*Primary Examiner*—Christopher Revak
*Assistant Examiner*—Kaveh Abrishamkar
(74) *Attorney, Agent, or Firm*—Brian A. Lemm; Angelo N. Chaclas

(57) ABSTRACT

In a value dispensing system, a system and method for securely loading and executing software in a secure device that does not include any non-volatile programmable memory is provided. A non-secure portion of the value dispensing system stores software for loading into the secure portion when needed. Commands being sent to the secure printer are monitored to determine if the secure has the necessary software to execute the command. If the secure device currently does not have the necessary software to execute the command, the command is delayed and the proper software is loaded from the non-secure portion to the RAM of the secure device. A signature associated with the software is verified to ensure the authenticity of the software. If the signature is verified, the command is passed to the secure device, and, utilizing the software in the RAM, the command is executed by the secure device.

14 Claims, 4 Drawing Sheets

METHOD FOR SECURELY LOADING AND EXECUTING SOFTWARE IN A SECURE DEVICE THAT CANNOT RETAIN SOFTWARE AFTER A LOSS OF POWER

FIELD OF THE INVENTION

The invention disclosed herein relates generally to secure value dispensing systems, and more particularly to a method and system for securely loading and executing software in a secure value dispensing system that cannot retain the software when power cycled.

BACKGROUND OF THE INVENTION

One example of a value printing system is a postage evidencing system including an electronic postage meter and a printer for printing a postal indicia on an envelope or other mail piece. Electronic postage meters for dispensing postage and accounting for the amount of postage used are well known in the art. A postal security device (PSD) of the meter supplies evidence of the postage dispensed in the form of an indicia for printing on a mail piece, such as, for example, an envelope or the like.

The printed indicia typically employs cryptographically secured information including a postage value for the mail piece combined with other postal data that relate to the mail piece and the postage meter printing the indicium. The cryptographically secured information, typically referred to as a digital token or a digital signature, authenticates and protects the integrity of information, including the postage value, imprinted on the mail piece for later verification of postage payment. Since the digital token incorporates cryptographically secured information relating to the evidencing of postage payment, altering the printed information in an indicium is detectable by standard verification procedures.

Presently, postage metering systems are recognized as either closed or open system devices. In a closed system device, the printer functionality is solely dedicated to metering activity. Examples of closed system metering devices include conventional digital and analog postage meters wherein a dedicated printer is securely coupled to a metering or accounting function device. In a closed system device, since the printer is securely coupled and dedicated to the meter, printing cannot take place without accounting. In conventional closed system mechanical and electronic postage meters, a secure link is required between printing and accounting functions. For postage meters configured with printing and accounting functions performed in a single, secure box, the integrity of the secure box is monitored by periodic inspections of the meters. More recently, digital printing postage meters typically include a digital printer coupled to the PSD, and have removed the need for physical inspection by cryptographically securing the link between the accounting and printing mechanisms. In essence, new digital printing postage meters create a secure point-to-point communication link between the PSD and print head. Thus, the meter and printer can now be physically separable from each other and are no longer contained within the same secure housing.

There are problems, however, with systems in which the meter is physically separable from the printer. For example, the complexity of the system is increased, as it is necessary to include redundant components within each portion of the separable parts. For example, both the printer and the meter must be provided with individual controllers and memories, as they can no longer share the same components. Such memory devices can include, for example, read-only memory (ROM), random access memory (RAM), and non-volatile programmable memory, such as, for example, Flash memory or Electrically Erasable Programmable Read Only Memory (EEPROM). This redundancy also leads to significant cost increases as well. It is therefore desirous to reduce the amount of redundant components necessary for operation of the system. One area where reduction may be possible is with the storage devices, i.e., memory, within the printer. For example, the complexity and cost of the system can be decreased if the printer is not provided with non-volatile programmable memory. This, however, creates several problems for the system. For example, a computing device with no non-volatile programmable storage is only capable of executing code from two places: its read-only memory (ROM), which must be programmed at the time of manufacture and is unalterable, and its random access memory (RAM), which must be loaded with code from an external source after each power cycle because it requires power to retain its contents. In addition, the amount of available memory is a limiting factor to the code that can be executed. Furthermore, due to the security required for the value dispensing system, it is necessary to secure the code loaded into the RAM to verify the authenticity of the code and its origin as a legitimate source, thereby preventing fraudulent use of the value dispensing system.

There exists a need, therefore, for a method and system that can securely load and execute software in a value dispensing system that does not include any non-volatile programmable memory.

SUMMARY OF THE INVENTION

The present invention alleviates the problems associated with the prior art and provides a system and method for securely loading and executing software in a secure device of a value dispensing system, in which the secure device does not include any non-volatile programmable memory.

In accordance with the present invention, a secure printer of a value dispensing system, such as, for example, a postage meter, is not provided with any non-volatile programmable memory, but only with RAM and ROM. A non-secure portion of the value dispensing system stores software for loading into the secure portion when needed. Preferably, the software is signed with a digital signature to allow for authentication and integrity verification of the software. Commands being sent to the secure printer are monitored to determine if the printer has the necessary software to execute the command. If the printer currently does not have the necessary software to execute the command, the command is delayed and the proper software is loaded from the non-secure portion to the RAM of the secure printer. Preferably, the signature associated with the software is verified to ensure the authenticity of the software. If the signature is verified, the command is passed to the secure printer, and, utilizing the software in the RAM, the command is executed by the secure printer. When power is removed from the system, any software stored in the RAM will be erased.

The system and method of the present invention provide several advantages over conventional value dispensing systems. For example, since the signature of the software is checked each time the software is loaded into the secure printer, the security of the software increases as any detection of tampering with or changing of the software will be quickly detected and the system will become inoperable. Additionally, a significant cost reduction is achieved by removing the necessity for any type of non-volatile programmable memory in the secure printer. Additionally, the erasure of any software stored in the RAM of the printer upon removal of power to the printer prevents any tampering with the software or images. Furthermore, the amount of RAM required in the printer can be minimized, as the necessary software can be broken down into different functional blocks that are loaded on an as-needed basis. It is, therefore, not necessary to maintain large amounts of software stored in the RAM at a given time. If a command requires a functional block not currently loaded in the RAM, the necessary functional block can be written over a functional block not needed for the command.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
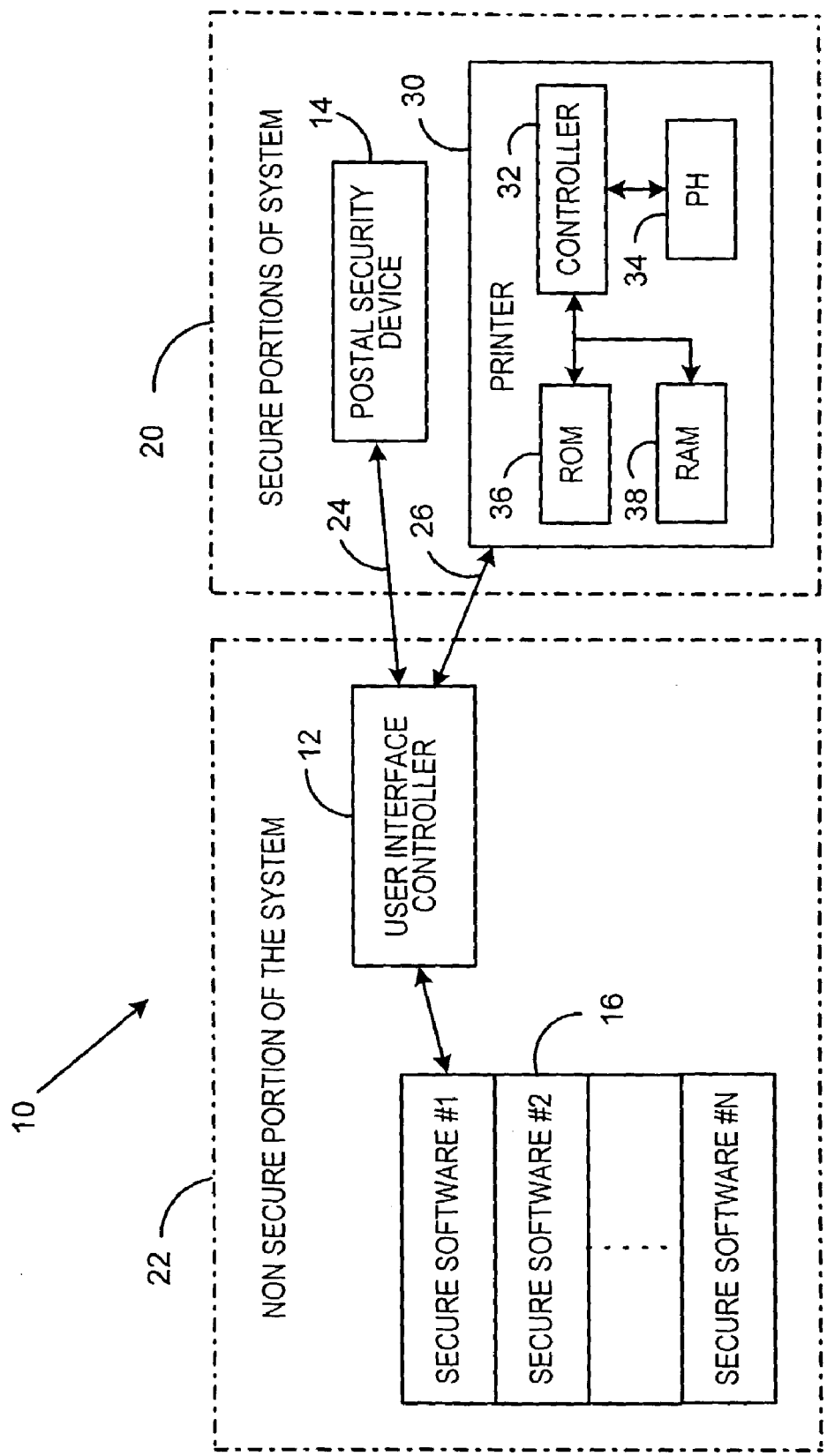
FIG. 1 illustrates in block diagram form a value dispensing system in accordance with the present invention.

In describing the present invention, reference is made to the drawings, wherein there is seen in FIG. 1 in block diagram form a value dispensing system 10 in accordance with the present invention. Value dispensing system 10 may be, for example, a postage meter provided as part of a mailing processing device, such as a mailing machine or the like. While the present invention will be described with respect to a postage meter, it should be understood that the present invention is not so limited and can be utilized with any type of value dispensing system.

System 10 includes a control device 12, hereinafter referred to as a User Interface Controller (UIC), that performs user interface and controller functions for the system 10. Specifically, the UIC 12, in conjunction with one or more embedded processors or controllers, provides all user interfaces, executes control of the value dispensing system 10, calculates postage for debit based upon rate tables, provides the conduit for a Postal Security Device (PSD) 14 to transfer postage indicia to a printer 30, operates with peripherals for accounting, printing and weighing, and conducts communications with a data center for postage funds refill, software download, rates download, and market-oriented data capture. The PSD 14 contains one or more registers that store the accounting information concerning usage, such as, for example, an ascending register, descending register, piece count register, and the like. As such, the PSD 14 must be secure, i.e., the PSD 14 must be safeguarded against tampering with the registers or operation to prevent any type of fraudulent use or manipulation of the funds stored therein. The UIC 12, in conjunction with the PSD 14, provides the system meter that satisfies U.S. and international postal regulations regarding closed system information-based indicia postage (IBIP) meters.

As noted above, system 10 includes a printer 30 used to print the value bearing indicia. As such, the printer 30 must also be secure, i.e., the printer 30 must be safeguarded against tampering with its operation or information stored therein to prevent any type of fraudulent printing of the value bearing indicia. Thus, as illustrated in FIG. 1, both the PSD 14 and the printer 30 of system 10 must be maintained as secure portions of the system 10, denoted by dashed line 20. The UIC 12 need not be secure, and therefore is part of the non-secure portion of the system 10 denoted by dashed line 22. It should be noted that the PSD 14 can be embedded in the UIC 12 within a secure portion of the UIC 12.

During operation of the system 10, a request for an indicium is sent from the UIC 12 to the PSD 14 via a communication link 24. Accounting for the indicium is performed in the PSD 14 and a digital token is created and sent to the UIC 12 via the communication link 24. The UIC 12 creates an indicium message, including the digital token, and sends the indicium message to the printer 30 via a communication link 26 for processing. A controller 32 in the printer 30 processes the indicium message to generate signals to control a print head 34 of the printer 30 to print the indicium. As previously noted, digital printing postage meters have removed the need for physical inspection by cryptographically securing the links, e.g., links 24 and 26, between the accounting, e.g., PSD 14, and printing mechanism, e.g., printer 30. Thus, the PSD 14 and printer 30 can now be physically separable from each other and are no longer contained within the same secure housing. As such, the printer 30 must be provided with its own controller and storage devices, i.e., memory, for storing the software programs that are executed by the controller.

In accordance with the present invention, printer 30 is provided only with a ROM 36 and a RAM 38, and is not provided with any non-volatile programmable memory. This significantly decreases the cost and complexity as compared with conventional printers that require ROM, RAM and non-volatile programmable memory to operate. According to the present invention, software necessary for operation of the printer 30 is stored in a memory 16 located in the non-secure portion 22 of the system 10, and is loaded into the printer 30 when needed as further described below. Preferably, the software is cryptographically protected, utilizing a digital signature, before it is stored in the memory 16. As such, the authenticity of the software can be verified by verifying the digital signature as further described below.

Figure 2:
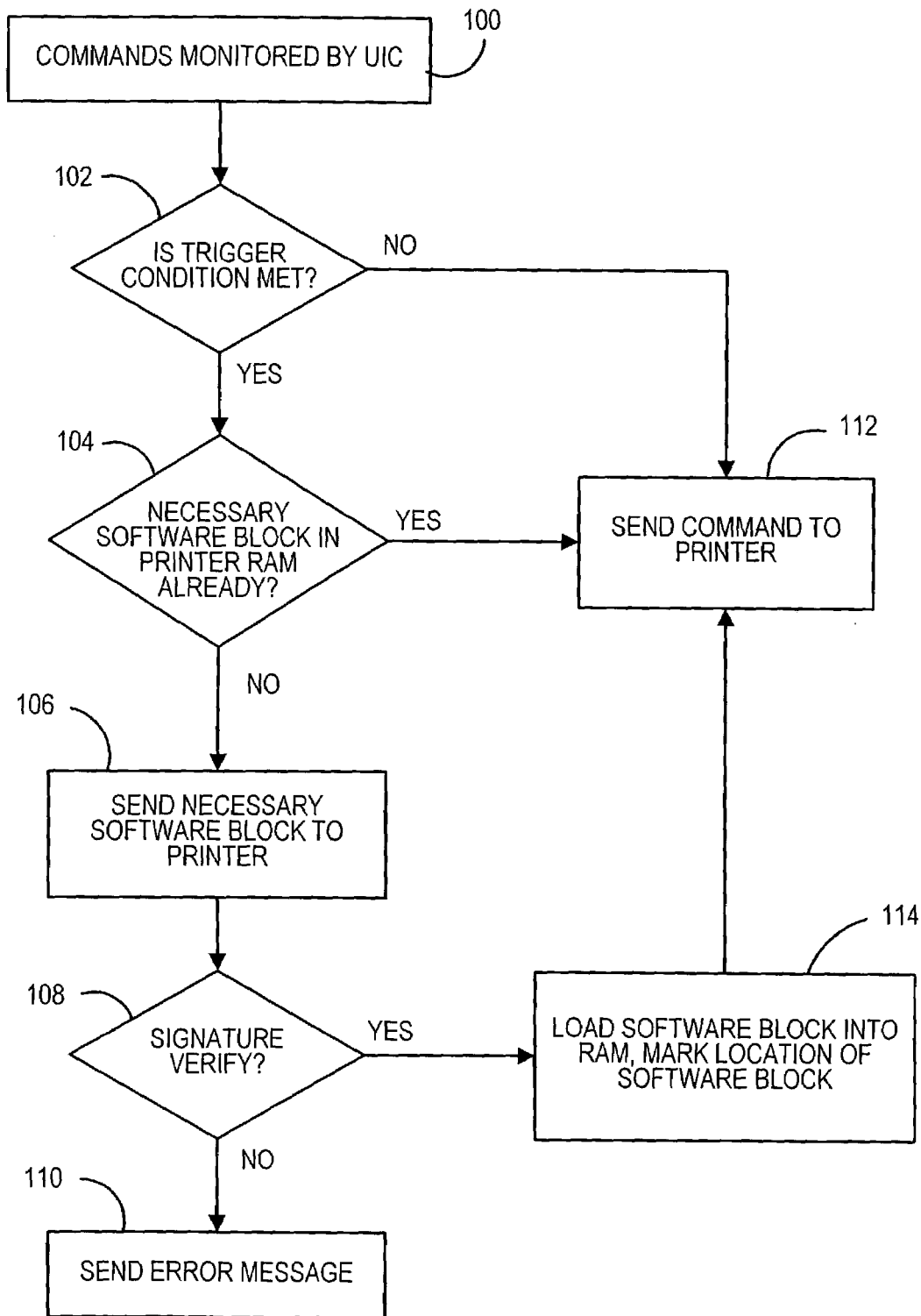
FIG. 2 illustrates in flow chart form the loading of software into a secure portion of the value dispensing system in accordance with the present invention.

Referring now to FIG. 2, there is illustrated in flow chart form the loading of software from the non-secure portion 22 of the system 10 into the secure portion 20 in accordance with the present invention. For example, software can be downloaded from the memory 16 to the RAM 38 of printer 30. In step 100, the UIC 12 monitors all commands intended for the printer 30. When a command intended for the printer 30 is detected, in step 102 it is determined if a trigger condition is met. The trigger condition is met, for example, by a command requiring a functional block of software stored in the memory 16, such as, for example, software #1 thru software #N as illustrated in FIG. 1. The software blocks could include, for example, software for authenticating the printer 30 with the PSD 14 during initialization of the system 10, software for the loading of a cryptographic key into the printer 30, software for loading and printing an indicia by the printer 30, software for generating and printing a test print by the printer 30, software for printing one or more reports by the printer 30, software for the downloading of graphics to the printer 30, etc.

Figure 4:
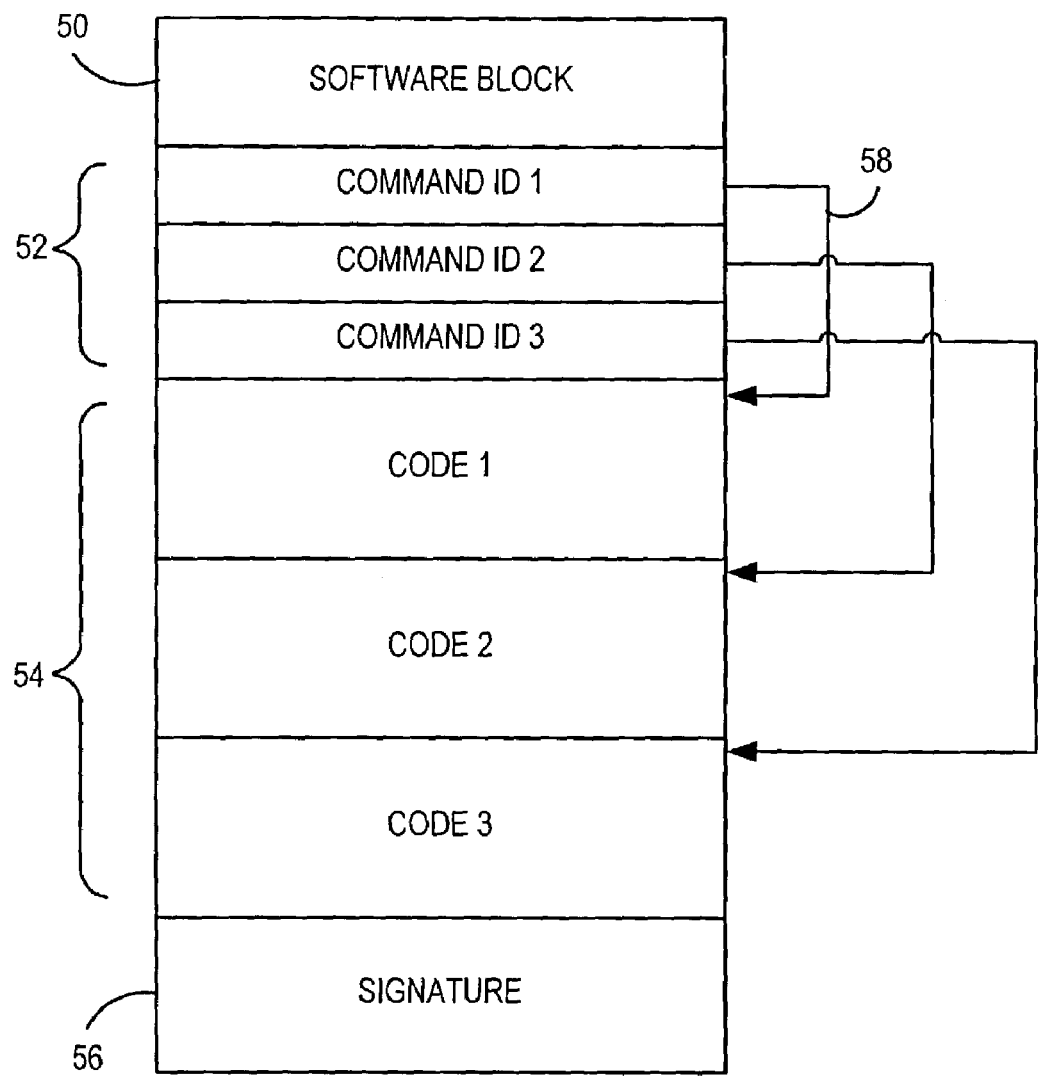
FIG. 4 illustrates in block diagram form the structure of a software block according to the present invention.

An exemplary structure of a software block 50 according to the present invention is illustrated in FIG. 4. The software block 50 includes a first area 52 for a routing table, a second area 54 for storing the software code, and a third area 56 for the digital signature of the software block 50. The routing table contains one or more entries of a command identification (Command ID) that identifies each of the commands for which code is present in the software block 50. Thus, for example, as illustrated in FIG. 4, the software block comprises three different software codes (CODE 1, CODE 2, CODE 3) each of which performs a different function. The functions may be related to one another, or may be independent of each other. Each command identification entry in the routing table also includes an associated address or pointer that indicates where in the software block 50 the code for that command begins. Thus, for example, COMMAND ID 1 includes an address or pointer, indicated by line 58, that provides the location in software block 50 that the code associated with COMMAND ID 1, i.e., CODE 1, is located. The use of the routing table is further described below.

Referring again to FIG. 2, if in step 102 it is determined that a trigger condition is not met, i.e., the command does not require any software stored in memory 16, then in step 112 the command is sent to the printer 30. Such commands could, for example, be intended to be executed by software stored in the ROM 36 of printer 30. For example, ROM 36 could contain boot loader programs utilized during power-up for status checks and the like, or programs necessary to conduct downloads into the printer 30 which do not need to be changed and therefore can be programmed at the time of manufacture of the printer 30.

If in step 102 it is determined that a trigger condition is met, then in step 104 it is determined if the software block required to execute the command is already in the RAM 38 of printer 30. The UIC 12, which controls the downloading of software into the RAM 38 of printer 30, maintains a record of the software currently loaded in the RAM 38. It should be understood, of course, that upon power-up of the system 10, none of the software blocks stored in memory 16 will be stored in the RAM 38 of printer 30, and every command in which a trigger condition is met will require the downloading of the appropriate software block. If, however, a similar command is repeated during the same session, the software block from the first instance of the command may still be present in the RAM 38 if not erased and overwritten by a subsequent software block. Thus, if the software was previously loaded in the RAM 38 and not subsequently overwritten by another software block, then in step 104 it will be determined that the necessary software block is already present in the RAM 38 and in step 112 the command will be sent to the printer 30 for execution by the controller 32 utilizing the appropriate software block already stored in RAM 38.

If in step 104 it is determined that the software block necessary to execute the command is not already in the RAM 38 of printer 30, then in step 106 a copy of the required software block will be sent from the memory 16 to the RAM 38 of printer 30 via the UIC 12. In step 108, the signature of the software block sent in step 104 is verified by the controller 32 of printer 30. Verification of the signature ensures the software block is from an authorized source, i.e., UIC 12, and also verifies that the software block has not been changed or altered in any manner. If in step 108 it is determined that the signature does not verify, meaning either the software block is not from an authorized source or has been altered, then in step 110 an error message will be returned to the UIC 12 and the software will not be stored in the RAM 38 of printer 30. The return of an error message from the printer 30 will cause the UIC 12 to enter a standby mode and the UIC 12 will not allow the value dispensing system 10 to operate, thereby preventing any fraudulent use of the system 10. Optionally, a message could be displayed to an operator, via UIC 12, indicating an error. If in step 108 it is determined that the signature is verified, then in step 110 the software is loaded and stored in the RAM 38 of printer 30, and an address location of the software block is marked to allow future access to the software block. It should be understood that upon power-up of the system 10 the RAM 38 will be empty, and thus any downloaded software blocks can be stored in the empty address areas. As additional commands are processed, and additional software bocks downloaded, it will be necessary to overwrite or erase one or more software blocks already stored in the RAM 38 to accommodate a new software block. In accordance with one embodiment, the software block being overwritten or erased is arbitrarily selected based only on the space required for the new software block. In accordance with another embodiment of the present invention, each software block is provided with a ranking, based on amount of use, and the lowest ranking software block currently stored in the RAM 38, i.e., the software block utilized the least, will be selected for erasure or overwriting to accommodate the new software block. In step 112 the command is passed from the UIC 12 to the printer 30 for execution by the controller 32.

Figure 3:
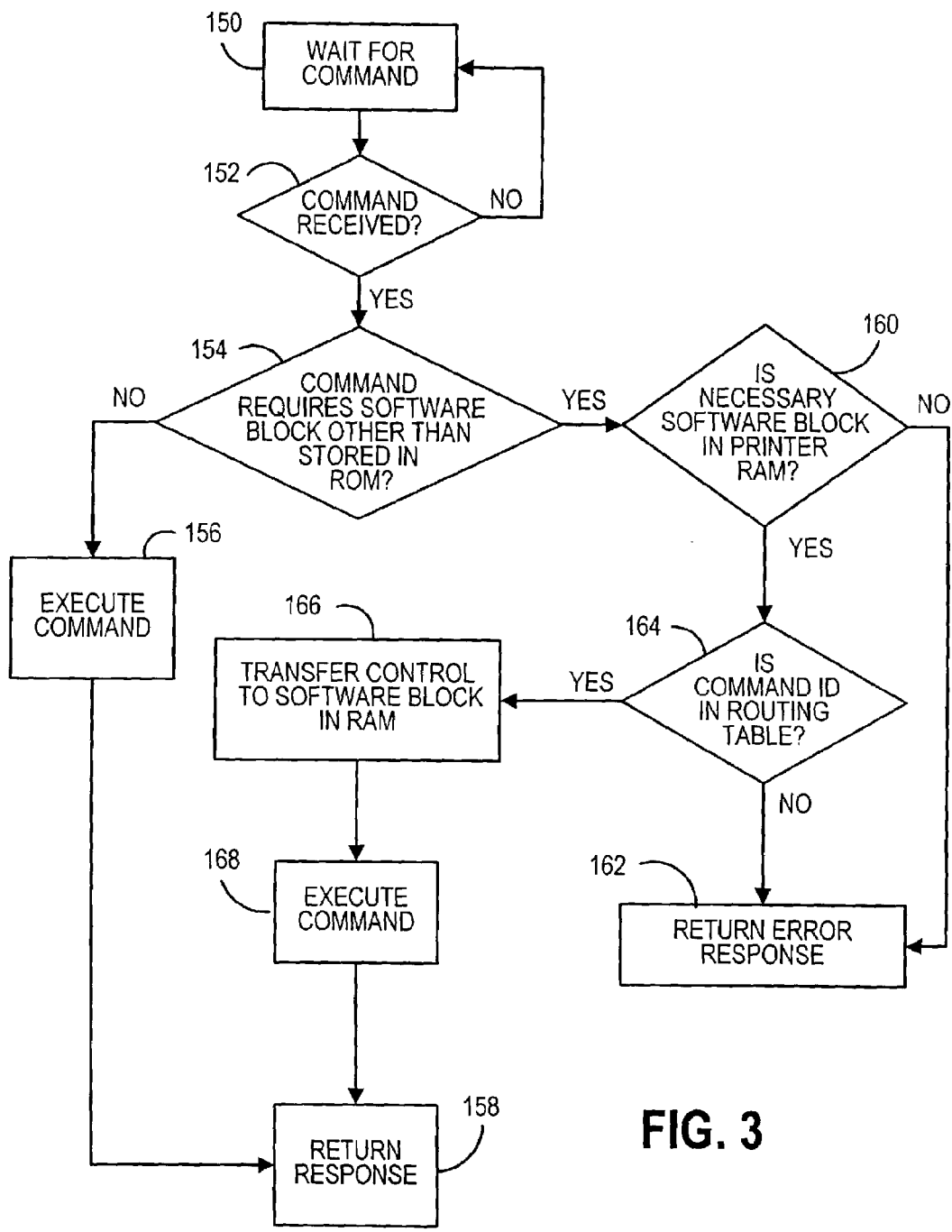
FIG. 3 illustrates in flow chart form the processing of a command performed by the secure portion of the value dispensing system without any non-volatile programmable memory in accordance with the present invention.

Referring now to FIG. 3, there is illustrated in flow chart form the processing of a command performed by a secure device, such as, for example, the printer 30, of the value dispensing system 10 in accordance with the present invention. In step 150, the printer 30 is waiting for a command from the UIC 12. In step 152, it is determined if a command has been received. If no command has been received, the printer 30 continues to wait for a command in step 150. If in step 152 it is determined that a command has been received, then in step 154 it is determined if the command requires a software block other than that stored in the ROM 36, i.e., a software block from the memory 16. Commands that utilize a software block other than software blocks stored in the ROM 36 could include, for example, authenticating the printer 30 with the PSD 14 during initialization of the system 10, loading a cryptographic key into the printer 30, loading and printing an indicia by the printer 30, generating and printing a test print by the printer 30, printing one or more reports by the printer 30, downloading of graphics to the printer 30, and the like. The software blocks for executing these commands would be downloaded, in accordance with the present invention, and stored in the RAM 38 on an as-needed basis. If in step 154, it is determined that the command does not require a software block other than one stored in the ROM 36 of printer 30, i.e., the command is for execution utilizing software in the ROM 36, then in step 156 the command is executed by the controller 32, utilizing the software in the ROM 36, and in step 158 a response is returned from the printer 30 to the UIC 12 indicating the command has been executed.

If in step 154 it is determined that the command does require a software block other than one stored in the ROM 36, then in step 160 it is determined if the necessary software block is currently stored in the RAM 38 of the printer 30. This determination can be performed, for example, by the controller 32 of the printer 30. If the system 10 is properly operating, the necessary software block would have been loaded and stored in the RAM 38, as described with respect to FIG. 2, before the command was sent to the printer 30. Thus, step 160 provides an operational check to ensure proper operation of the system 10. If in step 160 it is determined that the necessary software is not in the RAM 38, then in step 162 an error response is returned to the UIC 12 and the command will not be executed. If in step 160 it is determined that the necessary software is in the RAM 38, then in step 164 the appropriate software block in the RAM 38 is accessed, using the address for the software block stored in step 110 of FIG. 2, and it is determined if the command identification (Command ID) for the command is present in the routing table. This provides another operational check to ensure that the proper code is in the RAM 38 and prevents any tampering with software of the system 10. If the Command ID is not present in the routing table, indicating the specific command can not be executed, then in step 162 an error response is returned to the UIC 12 and the command will not be executed. It should be understood, of course, that the operational check performed in steps 160 and 164 are optional and need not be performed.

If in step 164 it is determined that the Command ID is in the routing table, then in step 166 control is transferred to the address specified in the Command ID entry in the routing table, i.e., to the address of the software block where the code associated with the Command ID begins. In step 168, the command is executed by the controller 32, utilizing the appropriate code extracted from the software block in the RAM 38, and in step 158 a response is returned from the printer 30 to the UIC 12 indicating the command has been executed.

Thus, according to the present invention, the printer 30 of a value dispensing system 10, such as, for example, a postage meter, is not provided with any non-volatile programmable memory, but only with RAM 38 and ROM 36. Software blocks for loading into the printer 30 when needed are stored in a non-secure portion 22 of the system 10. Preferably, the software is signed with a digital signature to allow for authentication and integrity verification of the software. Commands being sent to the printer 30 are monitored to determine if the printer 30 has the necessary software to execute the command. If the printer 30 currently does not have the necessary software to execute the command, the command is delayed and the proper software is loaded from the non-secure software is verified to ensure the authenticity of the software. If the signature is verified, the command is passed to the printer 30, and, utilizing the software in the RAM 38, the command is executed by the printer 30.

The system and method of the present invention provide several advantages over conventional systems. For example, the software blocks can contain additional security algorithms, thereby enhancing the security of the system. For example, the software block downloaded to the printer 30 can contain a hash and signature verification algorithm for graphics that are downloaded to the printer 30. In this manner, only certain graphics can be printed by the printer 30. As another example, the software blocks can be specific to different countries. For example, certain countries may require barcodes in their postal indicia, while other countries do not. With the present invention, only a single "raw" printer needs be manufactured, as it is not necessary at the time of manufacturing to know the destination country for the printer. The software can then be downloaded into the printer to customize the printing for the specific country. Furthermore, the present invention provides additional security to detect tampering with the operation of the system 10, thereby reducing the likelihood of fraudulent use of the system 10. For example, since the signature of the software block is checked each time the software block is loaded into the printer 30, the security of the software increases as any tampering with or changing of the software will be quickly detected and the system 10 will become inoperable. Additionally, the erasure of any software blocks stored in the RAM 38 of the printer 30 upon removal of power to the printer 30 prevents any tampering with the software or images.

Additionally, the present invention provides a significant cost reduction by removing the necessity for any type of non-volatile programmable memory in the printer 30. Further cost reductions are also realized in that the size of the RAM 38 required in the printer 30 can be minimized, as the necessary software can be broken down into different functional blocks that are loaded on an as-needed basis. It is, therefore, not necessary to maintain large amounts of software stored in the RAM 38 at a given time. If a command requires a functional block not currently loaded in the RAM 38, the necessary functional block can be written over a functional block not needed for the command.

While preferred embodiments of the invention have been described and illustrated above, it should be understood that they are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. In a mail processing device including a non-secure controller and a secure printer coupled to the non-secure controller, the secure printer having only read only memory and random access memory, a method for processing a command intended for the secure printer comprising:

monitoring, in the non-secure controller, commands intended for the secure printer;

determining if a software block necessary to execute the command is currently stored in the secure printer;

sending the software block from the non-secure controller to the secure printer if the software block is not currently stored in the secure printer, the software block including a routing table;

verifying, in the secure printer, a signature of the software block received from the non-secure controller;

storing the software block in the random access memory of the secure printer if the signature is verified;

determining if a command identification included with the command is in a routing table of the software block;

returning an error message to the non-secure controller if the command identification included with the command is not in the routing table of the software block; and if the command identification included with the command is in the routing table of the software block, executing the command, in the secure printer, utilizing the software block stored in the random access memory of the secure printer.

2. The method of claim 1, wherein determining if a software block necessary to execute the command is currently stored in the secure printer further comprises:
determining if a trigger condition is met;
if the trigger condition is met, determining if the necessary software block was previously downloaded to the secure printer; and
if the necessary software block was previously downloaded to the secure printer, determining if the necessary software block was subsequently erased or overwritten.

3. The method of claim 1, wherein executing the command utilizing the stored software block further comprises:
determining, in the secure printer, that the software block necessary to execute the command is stored in the random access memory of the secure printer;
executing the command if the software block necessary to execute the command is stored in the random access memory; and
returning an error response to the non-secure controller if the software block necessary to execute the command is not stored in the random access memory.

4. In a mail processing device including a non-secure controller and a secure printer coupled to the non-secure controller, the secure printer having only read only memory and random access memory, a method for processing a command in the secure printer received from the non-secure controller comprising:
receiving a software block necessary to execute the command from the non-secure controller of the mail processing device, the software block including a routing table;
verifying a signature of the software block;
storing the software block in the random access memory;
receiving the command from the non-secure controller, the command including a command identification;
determining if the command identification included with the command is in the routing table of the software block;
returning an error message to the non-secure controller if the command identification included with the command is not in the routing table of the software block; and
if the command identification included with the command is in the routing table of the software block, accessing software code associated with the command identification in the routing table and executing the command utilizing the accessed software code.

5. The method of claim 4, wherein storing the software block in the random access memory further comprises:
overwriting a previously downloaded software block stored in the random access memory.

6. The method of claim 5, wherein the previously downloaded software block for overwriting is selected based on its size.

7. The method of claim 5, wherein the random access memory stores a plurality of software blocks, each of the software blocks being ranked according to a predetermined criteria, and the previously downloaded software block for overwriting is selected based on its rank.

8. A mail processing device comprising:
a non-secure controller;
a secure printer coupled to the non-secure controller, the secure printer having only read only memory and random access memory;
a memory device coupled to the non-secure controller, the memory device storing at least one software block necessary for the secure printer to execute a command, the software block having an associated digital signature;
wherein the non-secure controller is adapted to monitor commands intended for the secure printer, determine if a software block necessary to execute a command to be sent from the non-secure controller to the secure printer is currently stored in the random access memory of the secure printer and send the software block necessary to execute the command from the memory device coupled to the non-secure controller to the secure printer if the software block is not currently stored in the random access memory of the secure printer, and the secure printer is adapted to verify signature of the software block, store the received software block in the random access memory of the secure printer if the signature is verified, determine if a command identification included with the command is in a routing table of the software block, return an error message to the non-secure controller if the command identification included with the command is not in the routing table of the software block, and execute the command utilizing the software block stored in the random access memory if the command identification included with the command is in the routing table of the software block.

9. The mail processing device of claim 8, wherein the command is associated with authentication of the secure printer during initialization of the mail processing device.

10. The mail processing device of claim 8, wherein the command is associated with printing an indicia.

11. The mail processing device of claim 8, wherein the command is associated with generating and printing a test print.

12. The mail processing device of claim 8, wherein the command is associated with printing a report.

13. The mail processing device of claim 8, wherein the command is associated with downloading graphics to the secure printer.

14. The mail processing device of claim 13, wherein the software block includes verification processing for the graphics.

* * * * *